United States Patent
Watanabe

(10) Patent No.: US 6,954,656 B2
(45) Date of Patent: Oct. 11, 2005

(54) INFORMATION PROCESSING APPARATUS AND NETWORK CONTROLLER SETTING METHOD

(75) Inventor: Gen Watanabe, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 526 days.

(21) Appl. No.: 09/954,033

(22) Filed: Sep. 18, 2001

(65) Prior Publication Data

US 2002/0037718 A1 Mar. 28, 2002

(30) Foreign Application Priority Data

Sep. 25, 2000 (JP) ........................................ 2000-291301

(51) Int. Cl.[7] .............................................. H04M 1/00
(52) U.S. Cl. .................... 455/566; 455/566.1; 715/762; 709/228
(58) Field of Search .............................. 455/525, 426.1, 455/566, 562.1, 452.1, 556.1, 412.1; 345/173, 762, 733, 16.9; 709/203, 229, 228; 715/762, 763; 379/93.17

(56) References Cited

U.S. PATENT DOCUMENTS 5,864,300 A    1/1999   Cho et al.
6,006,105 A   12/1999   Rostoker et al.

FOREIGN PATENT DOCUMENTS

| JP | 06-018080 | * | 1/1994 | ............. F24F/11/02 |
| JP | 406018080 A | * | 1/1994 | ............. F24F/11/02 |
| JP | 407200051 A | * | 8/1995 | ............. G05B/23/02 |
| JP | 11-194917 | * | 7/1999 | ............. G06F/1/26 |
| JP | 11-203223 | * | 7/1999 | ............. G06F/13/00 |
| JP | 41123223 A | * | 7/1999 | ............. G06F/13/00 |
| JP | 411194917 A | * | 7/1999 | ............. G06F/3/12 |
| JP | 02000069077 A | * | 3/2000 | ............. H04L/12/54 |
| JP | 2000-069077 | * | 3/2000 | ............. H04L/12/54 |

* cited by examiner

*Primary Examiner*—Melur Ramakrishnaiah
(74) *Attorney, Agent, or Firm*—Finnegan, Henderson, Farabow, Garrett & Dunner, L.L.P.

(57) ABSTRACT

There is provided a network controller setting method applied to an information processing apparatus with a plurality of network controllers. The method includes displaying a screen used to specify use/nonuse of each of the plurality of network controllers, and setting at least one of the plurality of network controllers, to which the use is not specified on the screen, in a disabled state. With this method, the unused network controllers can be brought reliably into the disabled state without letting the use have a sense of troublesomeness or imposing any burden on the user in setting a plurality of network controllers.

6 Claims, 6 Drawing Sheets

| Selecting a network controller |
|---|

| Select a network controller to be used | |
|---|---|
| Body | LAN docker |
| ☐ Ethernet controller A | ☑ Ethernet controller D |
| — Wireless network — ☐ Wireless LAN B ☐ Bluetooth C | |

INFORMATION PROCESSING APPARATUS AND NETWORK CONTROLLER SETTING METHOD

CROSS-REFERENCE TO RELATED APPLICATIONS

This application is based upon and claims the benefit of priority from the prior Japanese Patent Application No. 2000-291301, filed Sep. 25, 2000, the entire contents of which are incorporated herein by reference.

BACKGROUND OF THE INVENTION

1. Field of the Invention

The present invention relates to an information processing apparatus with a plurality of network controllers, and a network controller setting method.

2. Description of the Related Art

In recent years, various network standards have been determined. Networks complying with those standards are finding wide application. The spread of wireless communication networks is especially astonishing. With this spread, information processing apparatuses incorporating a plurality of network controllers of different types are coming onto the market.

The network controllers built in information processing apparatuses include Ethernet™ controllers conforming to the IEEE 802.3 standard, wireless LAN controllers conforming to the IEEE 802.11b standard, and Bluetooth™ controllers conforming to the Bluetooth standard.

Ethernet controllers are used to communicate with other information equipment via a LAN. Wireless LAN controllers are used to communicate with other information equipment via a wireless LAN. Bluetooth controllers are used to communicate with other information equipment via a Bluetooth short-distance wireless communication network.

Portable information processing apparatuses, such as notebook personal computers, can be used in various places because of their features. When connecting the information processing apparatus to the desired network at the place where the user has gone, the user sets a protocol and service in each network controller installed in the information processing apparatus so as to meet the network environment to which the network controller is to be connected. However, when setting is done so as to use simultaneously the network controllers built in the information processing apparatus, the following problem may arise.

For instance, in an information processing apparatus incorporating an Ethernet controller (complying with IEEE 802.3) and a wireless LAN controller (complying with IEEE 802.11b), when setting has been done so as to use both of the network controllers, the network controller unconnected to the network cannot recognize the network. In this case, in the process of initializing the network at the start-up of the OS, the user has to wait for the initialization of the unconnected network controller to be completed, which increases the user's waiting time.

To avoid this problem, the user, each time using the network, has to do setting so that the unused network controller cannot be used on the OS. In addition, when using the network controller, the user has to do setting so that the network controller may be used. That is, the user has to change the setting between the used network controller and the unused network controller. This causes the user to have a sense of troublesomeness or imposes burden on the user.

Furthermore, in an information processing apparatus incorporating a wireless LAN controller (complying with IEEE 802.11b) and a Bluetooth controller, when setting has been done so as to use both of the network controllers, the frequency band used in each of the controllers is almost the same at 2.4 GHz, causing interference. Thus, in this case, too, the user has to bring the unused network controller into the disabled state each time using the network. This causes the user to have a sense of troublesomeness or imposes burden on the user.

Moreover, in an information processing apparatus incorporating a plurality of network controllers as described above, when the user has connected each network controller to a different or the same (the same sub-net) network, there is a possibility that an unexpected trouble will develop. For instance, when each network controller is connected to a different network at the same time for the purpose of IP rooting, no problem will arise. With an OS that does not support the connection, however, the proper operation is not guaranteed. When each network controller has been connected to the same sub-net network, none of them can be used.

For this reason, there have been demands for an information processing apparatus and a network controller setting method which enable the unused network controllers to be brought reliably into the disabled state without letting the user have a sense of troublesomeness or imposing any burden on the user in setting a plurality of network controllers.

BRIEF SUMMARY OF THE INVENTION

According to one aspect of the present invention, there is provided an information processing apparatus with a plurality of network controllers, the apparatus comprising: a screen displaying unit configured to display a screen used to specify use/nonuse of each of the plurality of network controllers; and a setting unit configured to set at least one of the plurality of network controllers, to which the use is not specified on the screen, in a disabled state.

According to another aspect of the present invention, there is provided an information processing apparatus with a plurality of network controllers, the apparatus comprising: a specifying unit configured to causing a user to specify use/nonuse of each of the plurality of network controllers; and a setting unit configured to set at least one of the plurality of network controllers, to which the use is not specified, in a disabled state.

According to still another aspect of the present invention, there is provided an information processing apparatus comprising: a plurality of network controllers configured to perform wireless communication in same frequency band or to have same logical network configuration; a screen displaying unit configured to display a screen used to specify use/nonuse of each of the plurality of network controllers; and a setting unit configured to set at least one of the plurality of network controllers, to which the use is not specified on the screen, in a disabled state.

According to still another aspect of the present invention, there is provided an information processing apparatus comprising: a first network controller; a second network controller configured to perform wireless communication in same frequency band as the first network controller; a third network controller configured to have same logical network configuration as the first network controller; a screen displaying unit configured to display a screen used to specify use/nonuse of each of the first, second, and third network controllers; and a setting unit configured to set at least one of the first, second, and third network controllers, to which the use is not specified on the screen, in a disabled state.

According to still another aspect of the present invention, there is provided an information processing apparatus with a plurality of network controllers which is capable of being installed and removed in and from an expansion unit with a network controller, the apparatus comprising: a screen displaying unit configured to display a screen used to specify use/nonuse of each of the plurality of network controllers provided for the information processing apparatus and the network controller provided for the expansion unit; and a setting unit configured to set at least one of the plurality of network controllers, to which the use is not specified on the screen, in a disabled state.

According to still another aspect of the present invention, there is provided an information processing apparatus with a plurality of network controllers, the apparatus comprising: a screen displaying unit configured to display a setting screen for power saving that includes items for specifying use/nonuse of each of the plurality of network controllers; and a setting unit configured to set at least one of the plurality of network controllers, to which the use is not specified on the screen, in a disabled state.

According to still another aspect of the present invention, there is provided an information processing apparatus with a plurality of network controllers, the apparatus comprising: a screen displaying unit configured to display a screen used to specify use/nonuse of each of the plurality of network controllers; and a circuit configured to disconnect a specific signal line connected to at least one of the plurality of network controllers, to which the use is not specified on the screen.

According to still another aspect of the present invention, there is provided a network controller setting method applied to an information processing apparatus with a plurality of network controllers, the method comprising: displaying a screen used to specify use/nonuse of each of the plurality of network controllers; and setting at least one of the plurality of network controllers, to which the use is not specified on the screen, in a disabled state.

According to still another aspect of the present invention, there is provided a network controller setting method applied to an information processing apparatus with a plurality of network controllers which is capable of being installed and removed in and from an expansion unit with a network controller, the method comprising: displaying a screen used to specify use/nonuse of each of the plurality of network controllers provided for the information processing apparatus and the network controller provided for the expansion unit; and setting at least one of the plurality of network controllers, to which the use is not specified on the screen, in a disabled state.

According to still another aspect of the present invention, there is provided a network controller setting method applied to an information processing apparatus with a plurality of network controllers, the method comprising: displaying a setting screen for power saving that includes items for specifying use/nonuse of each of the plurality of network controllers; and setting at least one of the plurality of network controllers, to which the use is not specified on the screen, in a disabled state.

According to still another aspect of the present invention, there is provided a network controller setting method applied to an information processing apparatus with a plurality of network controllers, the method comprising: displaying a screen used to specify use/nonuse of each of the plurality of network controllers; and reflecting the contents specified on the screen in a specific circuit and causing the circuit to disconnect a specific signal line connected to at least one of the plurality of network controllers, to which the use is not specified on the screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the present invention will be explained.

Figure 1:
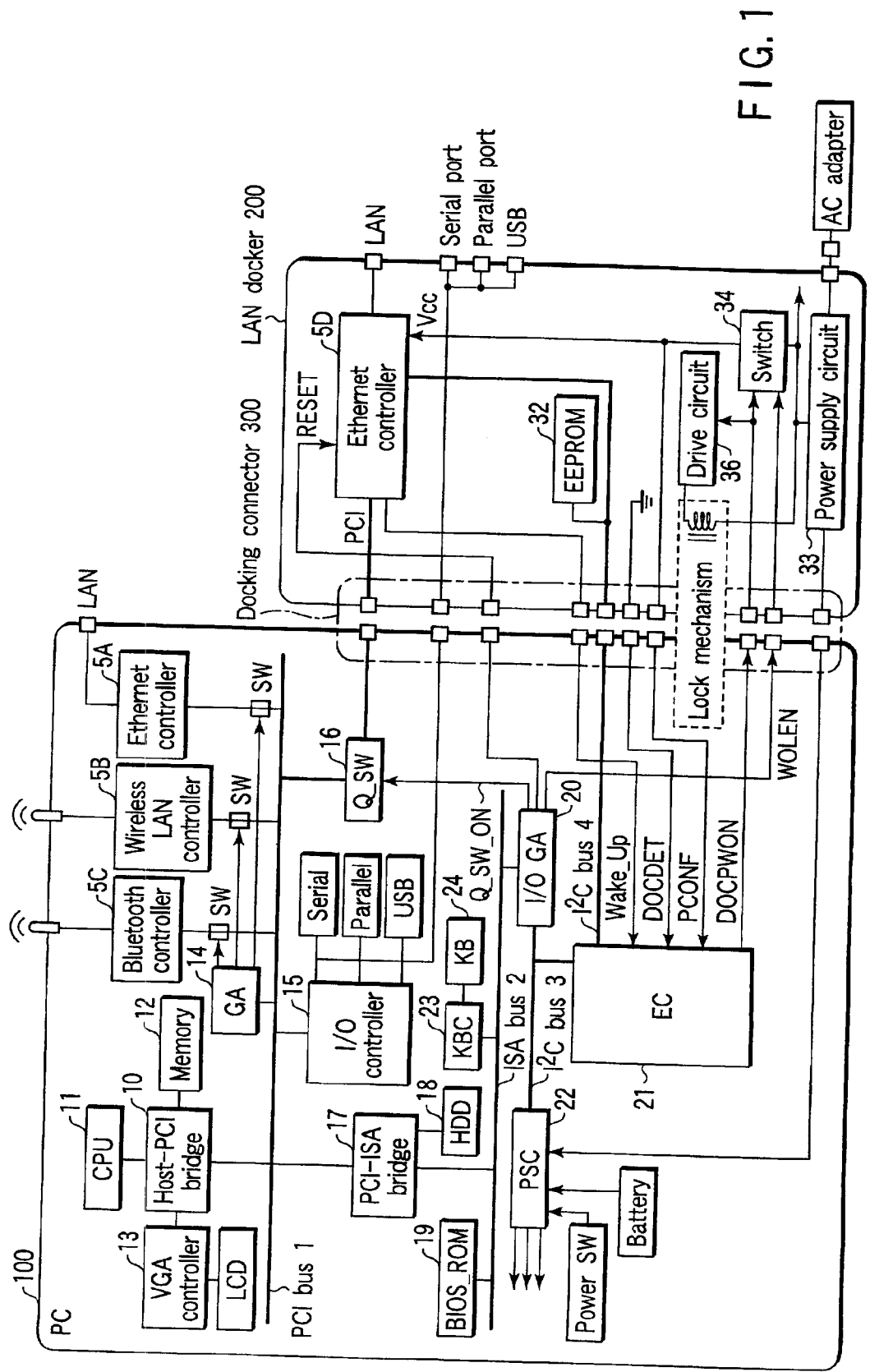
FIG. 1 is a block diagram showing the configuration of a computer system and a LAN docker according to an embodiment of the present invention.
Figure 2:
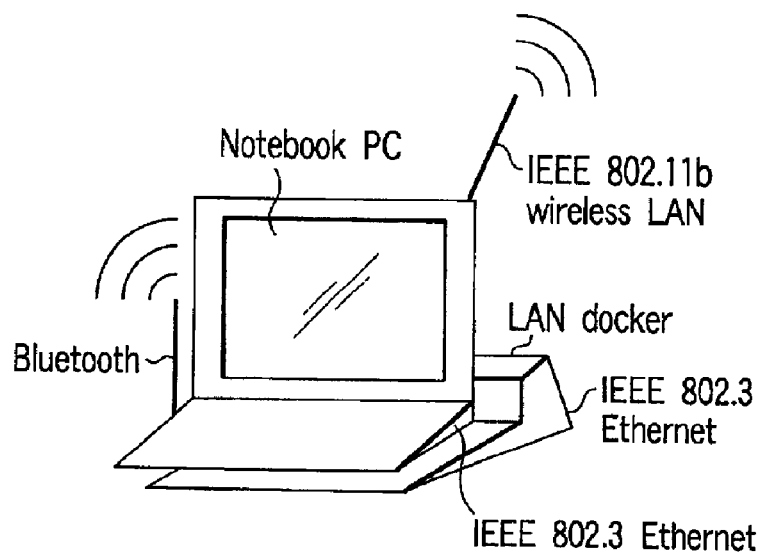
FIG. 2 is a perspective view of an outward appearance of the computer system and LAN docker.

FIG. 1 is a block diagram showing the configuration of a computer system and a LAN docker according to an embodiment of the present invention. FIG. 2 is a perspective view of an outward appearance of the computer system and LAN docker.

A computer 100 is a notebook personal computer (hereinafter, referred to as a PC) that can be driven by a battery. The body of the computer 100 is so constructed that it can be installed or removed freely in or from a LAN docker 200, an expansion unit for expanding the computer's function. The PC 100 and LAN docker 200 are connected to each other with their docking connectors.

For instance, the PC 100 is connected to the LAN docker 200 for use in the office. When going out of the office, the user disconnects the PC 100 from the LAN docker 200. Being disconnected from the LAN docker 200, the PC 100 operates from a built-in battery in the PC 100 or from an external power supply provided via an AC adapter. On the other hand, being connected to the LAN docker 200, the PC 100 operates from the built-in battery or from the AC-adapter power supply from the LAN docker 200.

For instance, the LAN docker 200 is put on the desk of each employee in the office. It is used, while being connected fixedly to a LAN cable laid in the office.

In the PC 100, there are provided three network controllers (an Ethernet controller 5A, a wireless LAN controller 5B, and a Bluetooth controller 5C) explained later. On the other hand, in the LAN docker 200, there is provided an Ethernet controller 5D explained later. In the embodiment, control is performed in such a manner that, of these network controllers, the ones the user need not use are brought into the disabled state (or the invalid state). A detailed explanation of it will be given later.

As shown in FIG. 1, the PC 100 includes a PCI bus 1, an ISA bus 2, two I$^2$C buses 3, 4, an Ethernet controller 5A, a wireless LAN controller 5B, a Bluethooth controller 5C, a host-PCI bridge 10, a CPU 11, a memory 12, a VGA controller 13, a gate array (GA) '14, an I/O controller 15, a Q switch (Q-SW) 16, a PCI-ISA bridge 17, an HDD 18, a BIOS-ROM 19, an I/O control gate array (I/O GA) 20, an embedded controller (EC) 21, a power-supply controller (PSC) 22, a keyboard controller (KBC) 23, and a keyboard (KB) 24.

The Ethernet controller 5A complies with the IEEE 802.3 standard and is used to communicate with other information equipment via a LAN. On the other hand, the wireless LAN controller 5B complies with the IEEE 802.11b and is used to communicate with other information equipment via a wireless LAN. A Bluetooth controller 5C conforms to the Bluetooth standard and is used to communicate with other information equipment via a wireless communication network.

The host-PCI bridge 10 has not only a bridge function of connecting the CPU 11 and PCI bus bilaterally but also the function of exchanging data with the memory 12 and VGA controller.

The CPU 11 performs the control of all the operation of the PC 100 and executes data processing. It includes a cache and a memory controller for controlling the memory 12. For example, the CPU 11 executes an application program loaded from the HDD 18 into the memory 12 to realize the control related to the present invention.

The memory 12 is used as a main memory of the system. In the memory 12, an operating system, various programs including an application program for realizing the control related to the present invention, the user data created by application programs, and others are stored.

The VGA controller 13 controls an LCD or an external CRT used as a display monitor for the system. The VGA controller 13 displays a screen that prompts the user to specify the use/nonuse of a network controller on, for example, the LCD.

The gate array 14 is a circuit used when any one of the network controllers 5A to 5C has to be made invalid using a hardware method. Under the control of the BIOS, the gate array 14 disconnects the IDSEL# signal line of a network controller to be made invalid.

The I/O controller 15, which is a gate array for controlling various I/O devices within the PC 100, controls the devices connected to various I/O connectors, including a serial port, a parallel port, and a USB port provided on the back of the PC 100. When the PC 100 and LAN docker 200 are connected to each other, the signals supplied from the I/O controller 15 to the I/O connector are passed to the connectors on the back of the LAN docker 200. This prevents the I/O connectors on the back of the PC 100 from being used because the LAN docker 200 covers them. Instead, the I/O connectors on the back of the LAN docker 200 can be used.

The Q switch (Q-SW) 16 is a switch circuit for making a connection or separation between the internal PCI bus 1 and the external PCI bus of the LAN docker 200. The on/off control of the Q switch 16 is performed by a switch control signal Q_SWON from the I/O control gate array (I/O GA) 20. Turning on the Q switch (Q-SW) 16 enables the PC 100 to use the Ethernet controller 5D.

The PCI-ISA bridge 17 is a gate array realized using a single chip LSI. In the PCI-ISA bridge 17, not only a bridge function of connecting the PCI bus 1 and ISA bus 2 bilaterally is built, but also an IDE controller for controlling the HDD 18 is provided.

The BIOS-ROM 19, which is for storing the BIOS, has a flash memory so that a program can be rewritten. The BIOS is obtained by systematizing the function executing routines that access various types of hardware in the system. The BIOS includes not only a power management function for bringing the system status into the operating state (power supply on state), the stop state (power supply off state), or the sleep state between the operating state and stop state (suspend/hibernation) and the function of recognizing a change in the system hardware environment automatically but also the function of managing the condition for docking with the LAN docker 200 and a wake-up control function using an instant security.

The function of managing the conduction for docking with the LAN docker 200 is carried out so as to enable the WOL/AOL function to be used only in a specific combination of the PC 100 and the LAN docker 200.

The I/O control gate array 20, which is a bridge LSI for connecting the internal ISA bus 2 and the I$^2$C bus 3, incorporates a plurality of register groups that the CPU 11 can read the data from or write the data into. Use of the register groups enables the CPU 11 to communicate with the power supply controller (PSC) 22 and embedded controller (EC) 21 on the I$^2$C bus 4.

The embedded controller (EC) 21, in cooperation with the power-supply controller (PSC) 22, manages the power-supply state of the PC 100. Even when the power supply of the PC 100 is turned off and the PC 100 goes into the sleep state or stop state, the operating power is kept being supplied to the embedded controller (EC) 21 and the power-supply controller (PSC) 22. The embedded controller (EC) 21 has the function of not only controlling the power-supply controller (PSC) 22 in response to the sensing of the occurrence of a power-supply on/off factor but also informing the BIOS of the occurred power-supply on/off factor as a power management event. The embedded controller (EC) 21 is further provided with the following functions of controlling the LAN docker 200: the function of sensing the docking/undocking of the PC 100 and LAN docker 200, the function of controlling of the power supply of the LAN docker 200, the function of monitoring the wake-up signal from the Ethernet controller 5D, and the function of communicating with the Ethernet controller 5D via the I$^2$C bus 4.

The Ethernet controller 5D provided in the LAN docker 200, which complies with the IEEE 802.3 standard, is used to communicate with other information equipment via a LAN. The Ethernet controller 5D has a "Wake on LAN (WOL)" function of turning on the power supply of a desktop PC by remote control from a server and an "Alert on LAN (AOL)" function of informing the server of an abnormality in the desktop PC automatically. When the WOL function is set in the enable state, the Ethernet controller 5D generates a wake-up signal Wake_up for turning on the power supply automatically when it has received a specific packet from a server via a LAN. In addition, when the AOL function is set in the valid state, the Ethernet controller 5D informs automatically the server via the LAN of an abnormality in the PC 100 or a change in the state, such as the docking/undocking of the PC 100 and LAN docker 200.

The docking/undocking of the PC 100 and LAN docker 200 is sensed using a dock detect signal DOCDET. The dock detect signal DOCDET, which has a voltage value at a specific pin of a docking connector 300, goes low when the PC 100 is connected to the LAN docker 200.

The power supply of the LAN docker 200 is controlled using a dock power-on signal DOCPWON and a wake-on LAN enable signal WOLEN.

The dock power-on signal DOCPWON is a power-supply on signal the EC 21 of the PC 100 sends to the LAN docker 200. When the dock power on signal DOCPWON becomes active, the LAN docker 200 goes into the power-supply on state.

The wake-on LAN enable signal WOLEN is a signal for determining whether to keep the LAN docker 200 in the power-supply on state when the dock power on signal DOCPWON is made inactive as a result of the turning off of the power supply of the PC 100 or the undocking of the PC 100. The signal WOLEN is sent from the I/O control gate array 20 of the PC 100 to the LAN docker 200.

When the WOL/AOL function of the Ethernet controller 5D has been set in the valid state, the BIOS sets the wake-on LAN enable signal WOLEN in the enable state. This enables power to be supplied constantly to the Ethernet controller 5D. Even when the power supply of the PC 100 is turned off and the PC 100 is set in the sleep or stop state, the Ethernet controller SD can communicate with a server. Since the switch circuit 34 provided in the LAN docker 200 still keeps the conducting state even when the WOLEN signal disappears after it has kept the conducting state at the presence of the WOLEN signal, the power supply to the Ethernet controller 5D is continued even when the power supply of the PC 100 is turned off after the enabling of the WOL function and is removed form the LAN docker 200.

The signal PCONF supplied from the LAN docker 200 to the EC 21 is used to check to see if the power supply of the Ethernet controller SD is off.

The LAN docker 200 is provided with not only the Ethernet controller SD but also an EEPROM 32, a power supply circuit 33, a switch circuit 34, a magnetic lock mechanism 35, and a drive circuit 36.

In the EEPROM 32, the PnP information necessary for Plug and Play has been stored. The PnP information includes attribute information about the LAN docker 200 and that about the Ethernet controller SD installed in the LAN docker 200.

The power supply circuit 33 generates the internal power supply of the LAN docker 200 from the AC adapter power supply. The power for the Ethernet controller SD is supplied from the power supply circuit 33 via the switch circuit 34 to the Ethernet controller SD.

The switch circuit 34 is controlled by the power supply control signal DOCPWON from the PC 100 side. If the DOCPWON is active, the switch circuit 34 is on, which allows the power to be supplied to the Ethernet controller 5D. If the DOCPWON is inactive, the switch circuit 34 is off, which prevents the power from being supplied to the Ethernet controller 5D. In the switch circuit 34, there is a state holding circuit. The state holding circuit is designed to hold the conducting state until the DOCPWON has become active next time, if the WOLEN signal is active when the DOCPWON signal changes from active to inactive.

The lock mechanism 35 is for locking the PC 100 to prevent the PC 100 docked with the LAN docker 200 from being ejected. The lock mechanism 35 locks the PC 100 during the time when the drive circuit 36 is supplying power to the solenoid.

The drive circuit 36 supplies power to the solenoid during the operating period when the PC 100 can use the Ethernet controller 5D, that is, during the period when the DOCPWON is kept active. The reason for this is to prevent an erroneous operation caused by the ejection of the PC in the middle of using the Ethernet controller 5D.

The following is an explanation of the process of controlling the network controllers in the embodiment. In the explanation below, for convenience's sake, the Ethernet controller 5A, wireless LAN controller 5B, Bluetooth controller 5C, and Ethernet controller 5D are indicated by the simple reference letters A, B, C, and D.

(When a PC is Used Independently)

An independently used PC 100 will be explained. Because the LAN docker 200 is not used at all, the Ethernet controller D is not taken into consideration. For this reason, the network controllers to be controlled include the Ethernet controller A, wireless LAN controller B, and Bluetooth controller C.

As described in the prior art, the frequency band of the wireless LAN controller B is close to that of the Bluetooth controller C, so that they cannot be used at the same time. In addition, since the Ethernet controller A and Bluetooth controller C have the same logical network configuration, it takes time to start up the OS, when the unused network controllers are not made invalid on the OS. Moreover, when the network controllers are used at the same time, there is a possibility that an expected problem will occur. Therefore, it is undesirable to use the Ethernet controller A and Bluetooth controller at the same time. From this viewpoint, the unused controllers are made invalid suitably without causing inconvenience to the user in the processes explained below.

Figure 3:
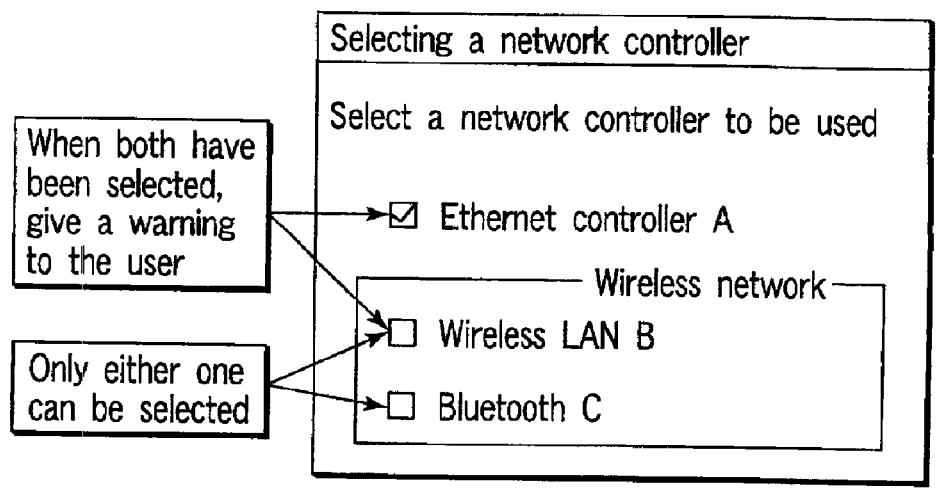
FIG. 3 shows a first dialog that prompts the user to select a network controller.
Figures 4, 5:
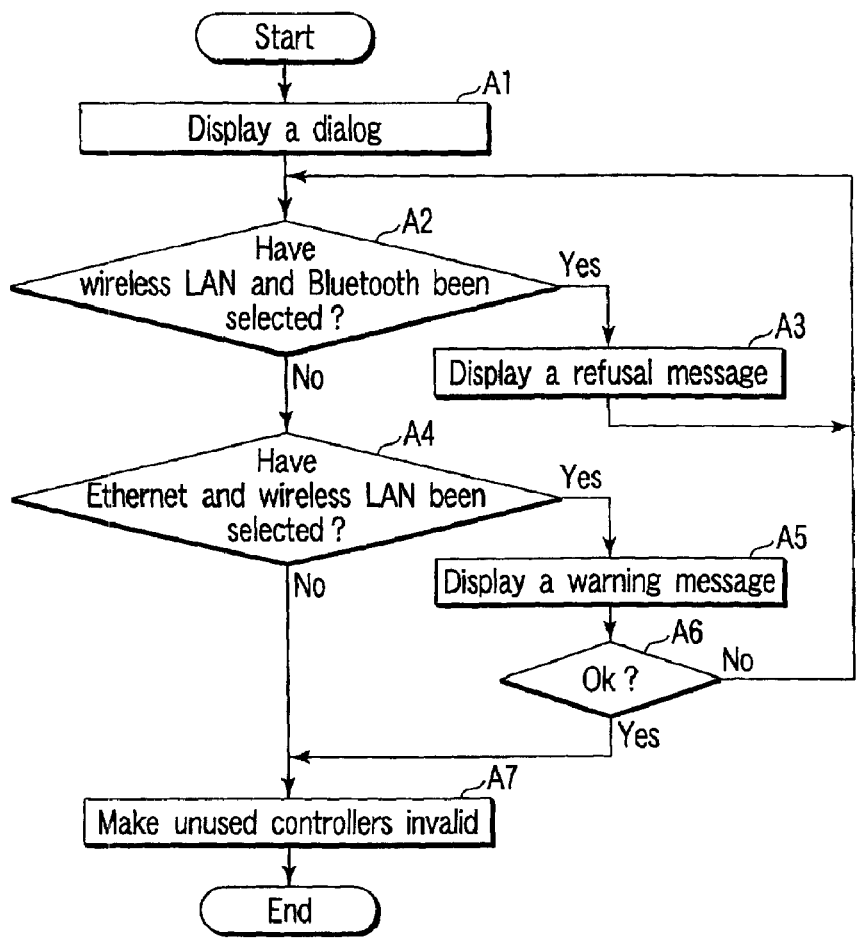
FIG. 4 is a flowchart for processing with the first dialog.
FIG. 5 shows a second dialog that prompts the user to select a network controller.

FIG. 3 shows a dialog that prompts the user to select a network controller. FIG. 4 is a flowchart for processing with the dialog.

When a specific application program (utility) on the memory 12 is executed at the start-up of the OS, a dialog as shown in FIG. 3 is shown (step A1 of FIG. 4). This dialog is for prompting the user to select the desired network controller. As shown in the figure, the Ethernet controller A, wireless LAN controller B, and Bluetooth controller C are listed as the choices in the dialog.

If the user has chosen both of the wireless LAN controller B and Bluetooth controller C (YES at step A2), a refusal message that two wireless networks cannot be chosen at the same time is displayed (step A3). On the other hand, if the user has not chosen the two controllers (NO at step A2), control goes to step A4.

If the user has chosen both of the Ethernet controller A and wireless LAN controller B (YES at step A4), a warning message that they will be connected to the same network is displayed (step A5). On the other hand, if the user has not chosen the two controllers (NO at step A4), control proceeds to step A7.

When the user has taken the warning and canceled the user's choice (NO at step A6), control returns to step A2 and forward. On the other hand, when the user wants to execute the choice, regardless of the warning (YES at step A6), control proceeds to A7.

As a result, setting is done so that the unused controllers excluding the controller selected by the user may be made invalid (step A7). The contents of the setting are stored in the HDD 18 or the like.

The user is allowed to call the dialog and change the settings freely.

(When PC can be installed and removed in and from the LAN docker)

The following is an explanation of the PC 100 that can be installed and removed in and from the LAN docker 200. Because the LAN docker 200 may be used, the Ethernet controller D must be taken into consideration. Thus, the network controllers to be controlled include the Ethernet controller A, wireless LAN controller B, Bluetooth controller C, and Ethernet controller D.

In this case, the addition of the Ethernet controller D having the same logical network configuration as that of the Ethernet controller A or wireless LAN controller B requires not only the above-described processes but also another process where further measures have been taken. Because the PC 100 and LAN docker 200 may be docked or undocked in the hot state where the system is operating or in the standby (or warm) state, it is necessary to switch between the validity/invalidity of each network controller, depending on whether they are docked or undocked. For this reason, such measures have been taken in the processes explained below.

Figure 6:
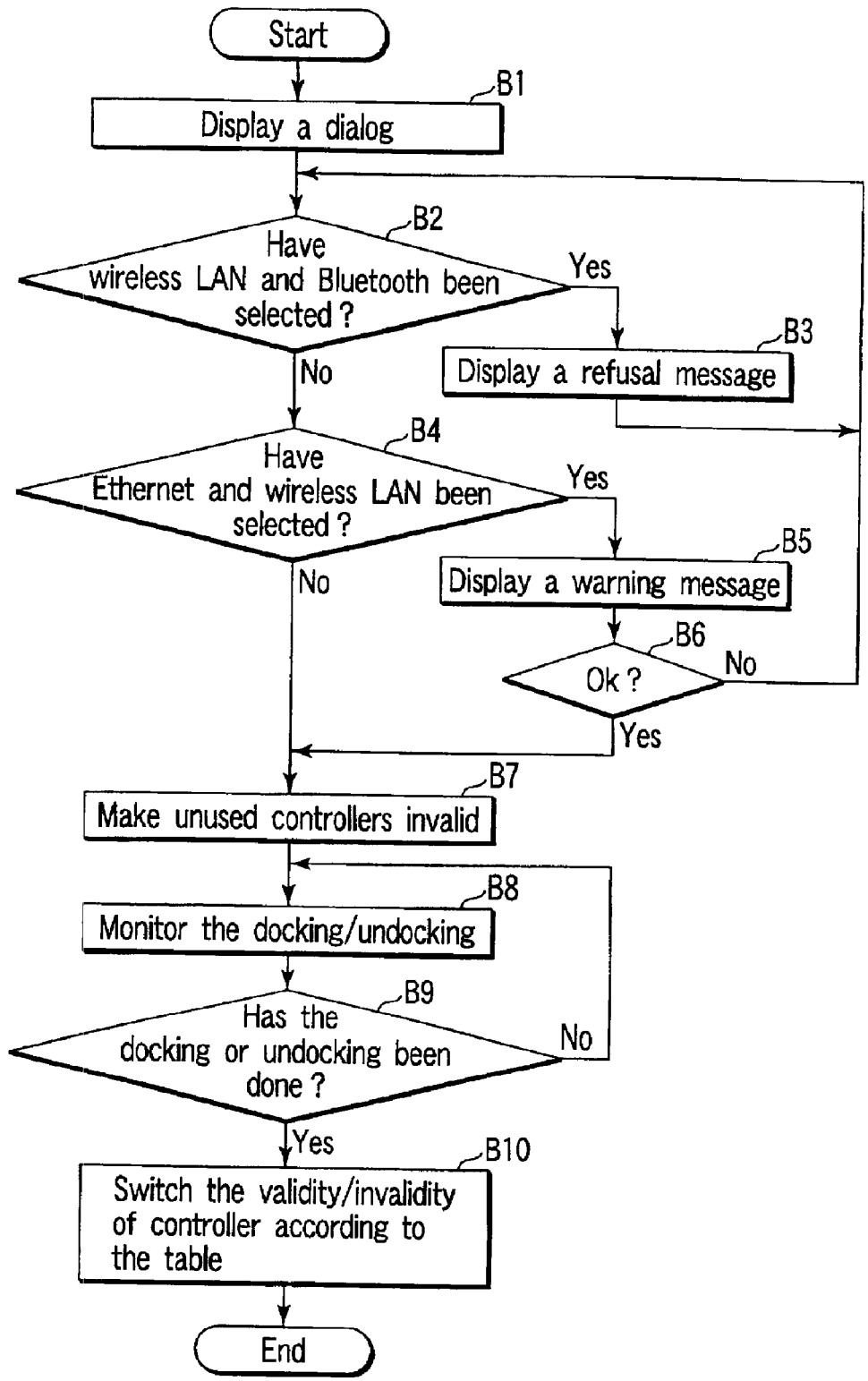
FIG. 6 is a flowchart for processing with the second dialog.
Figures 7, 9:
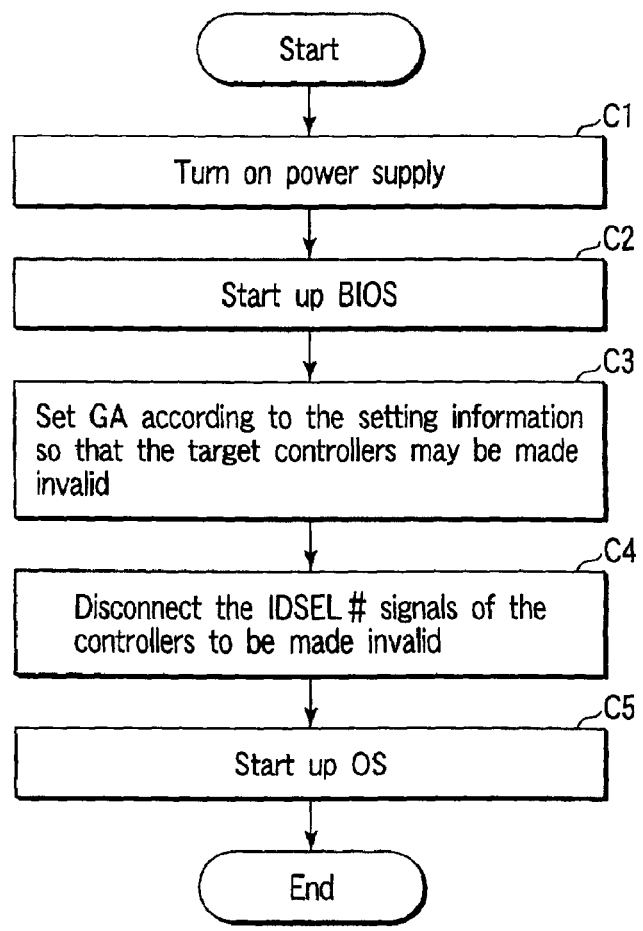
FIG. 7 is a table used to switch between the validity and invalidity of a network controller.
FIG. 9 is a flowchart for disabling a network controller using a hardware method.

FIG. 5 shows a dialog that prompts the user to select a network controller. FIG. 6 is a flowchart for processing with the dialog. FIG. 7 is a table used to switch between the validity/invalidity of a network controller.

When a specific application program (utility) on the memory 12 is executed at the time of starting up the OS, a dialog as shown in FIG. 5 is displayed (step B1 of FIG. 6). This dialog is used to prompt the user to select the desired network controller. As shown in FIG. 5, the dialog has the following choices: the Ethernet controller A, wireless LAN controller B, Bluetooth controller C on the PC body side, and the Ethernet controller D on the LAN docker side.

If the user has selected both of the wireless LAN controller B and Bluetooth controller C (YES at step B2), a refusal message that two wireless networks cannot be selected at the same time is displayed (step B3). On the other hand, if the user has not selected the two controllers (NO at step B2), control proceeds to step B4.

If the user has selected two or more of the Ethernet controller A, wireless LAN controller B, and Ethernet controller D (YES at step B4), a warning message that the selected controllers will be connected to the same network is displayed (step B5). On the other hand, if the user has not used two or more controllers (NO at step B4), control goes to step B7.

When the user has accepted the warning and canceled the user's choice (NO at step B6), control returns to step B2 and forward. On the other hand, when the user wants to execute the choice, regardless of the warning (YES at step B6), control proceeds to B7.

As a result, setting is done so that the unused controllers excluding the controller selected by the user may be made invalid (step B7). The contents of the setting are stored in the HDD 18 or the like.

Thereafter, the docking/undocking of the PC 100 with or from the LAN docker 200 is monitored (step B8). If the docking or undocking has been done (YES at step B9), switching is done between the validity/invalidity of each network controller according to the table of FIG. 7 (step B10). At that time, the system is restarted as the need arises, and resetting is done for the desired network controller.

In the table of FIG. 7, combinations of valid controllers have been defined for the case where the docked state changes to the undocked state and for the case where the undocked state changes to the docked state. In the table, all possible combinations have been defined. Although they include undesirable combinations, there is no problem with use.

In the table, the letters A to D represent the Ethernet controller A, wireless LAN controller B, Bluetooth controller C, and Ethernet controller D on the LAN docker side respectively. The symbol "+" means that the controllers are used at the same time. For instance, "B(C)" means that one of the network controllers B, C is valid.

As seen from the table, when the docked state changes to the undocked state, if the Ethernet controller D has been used, the Ethernet controller D is made invalid. On the other hand, when the undocked state changes to the docked state, the Ethernet controller D is made valid.

The user can change the contents of the table freely. For instance, the user can do setting so that only the Ethernet controller D may be made valid when the undocked state changes to the docked state. Alternatively, the user can do setting so that only the wireless LAN controller B may be made valid when the docked state changes to the undocked state.

As described above, the two processing operations enable the unused networks to be made invalid automatically without imposing a burden on the user and only the desired network to be made valid automatically.

(Combination with Power-saving Utility)

The following is an explanation of an example of putting the setting information for a network controller related to the present invention into the same template as that of the setting information for the conventional power-saving utility and managing them together to improve the user's convenience. The setting information for the power-saving utility includes information about the settings of the luminance of the LCD, the frequency of the CPU, and the power management of the PCI bus.

Figure 8:
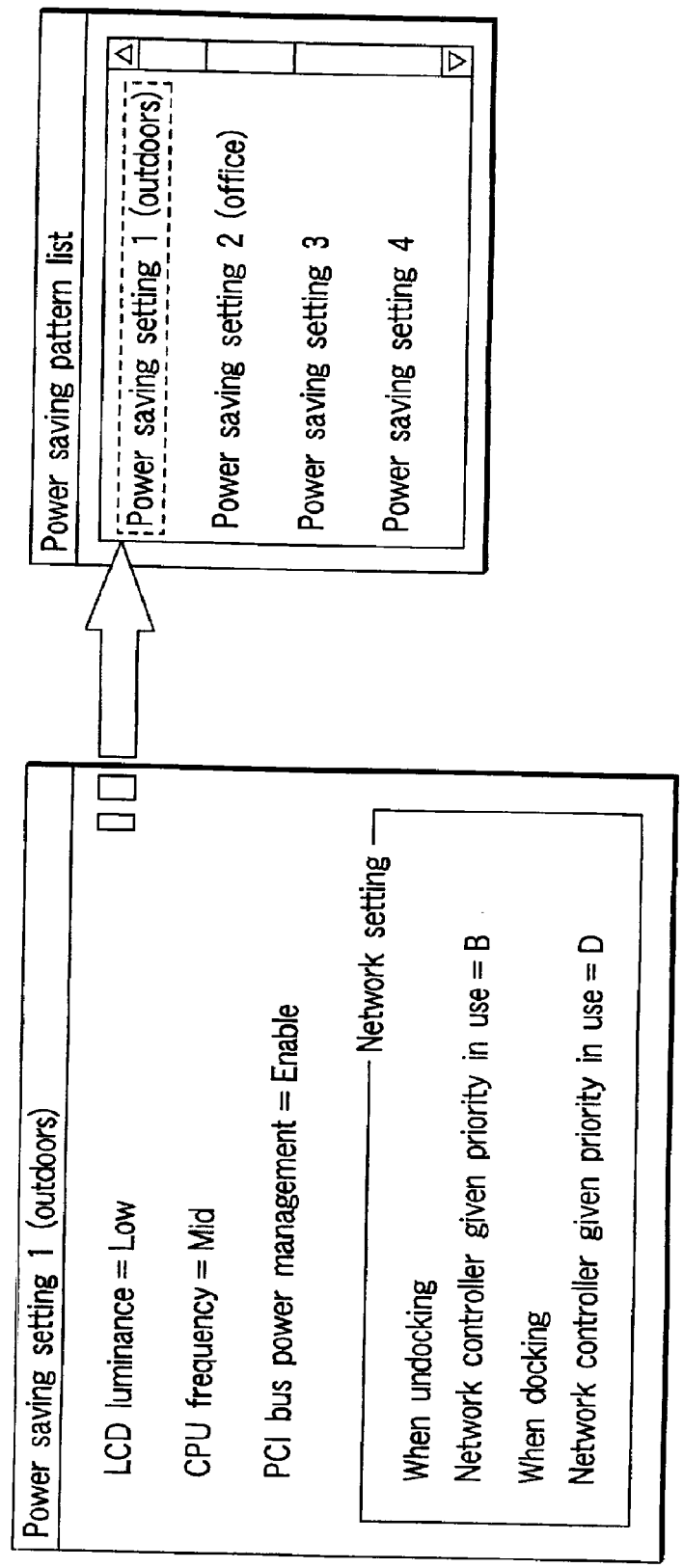
FIG. 8 shows a dialog formed by combining the setting information about a network controller and the setting information about a power-saving utility.

FIG. 8 shows a dialog formed by combining the setting information for network controllers and the setting information for a power-saving utility.

FIG. 8 shows a screen for power-saving setting 1 (outdoors) among a plurality of power-saving patterns (or power-saving settings 1 to 4). As shown in FIG. 8, not only the setting information about power saving, including the luminance of the LCD, the frequency of the CPU, and the power management of the PCI bus but also the setting information about network controllers are displayed. As for the setting of network controllers, there are prepared the item for setting a network controller given priority in use at the time of undocking and the item for setting a network controller given priority in use at the time of docking.

After the user has completed the setting, power-saving setting 1 (outdoors) is stored in the HDD 18 or the like as one of the power-saving patterns (or power-saving settings 1 to 4).

As a result, the user can set not only power saving but also the desired network controller easily when going out, for example, which makes it easy to select the corresponding network adapter. That is, the addition of the setting information about network controllers to the patterned pieces of power-saving setting information enables the user to set the desired network controller more easily.

(When a Network Controller is Made Invalid by Hardware)

To provide users wanting to construct their own network system with services, network controllers are required to be made invalid by a hardware method. Such users include the following users:

1. Users who add a new network controller within the PC (for example, those who add a PCMCIA-compatible Ethernet controller)

2. Users who construct the network system using a driver or utility developed originally for a security system or the functions for manageability (WOL or AOL).

Such users develop their own systems without using the preinstalled OS. In this case, it is undesirable that the controllers not to be used are recognized by the OS or the users. For instance, when the system requires a driver, this interrupts the developing work, lowering the working efficiency. The occupation of the hardware resources, including the memory space, is one factor that decreases the working efficiency. In this case, It is desirable that the unused network controllers should be made invalid using a hardware method.

In this embodiment, the gate array (GA) 14 for making any of the network controllers 5A to 5C invalid by a hardware method is provided as explained in FIG. 1. On the other hand, the network controllers 5A to 5C are connected to the PCI bus 1 as shown in FIG. 1. There are IDSEL # signal lines between the PCI bus 1 and the network controllers 5A to 5C. In the embodiment, a switch controlled by the gate array 14 is provided in the IDSEL # signal line of each network controller.

To enable the BIOS to recognize the network controllers to be made invalid when the BIOS is started on the BIOS-ROM 19, the user specifies beforehand the unused network controllers on the dialog using the utility and stores the contents in the HDD.

With this configuration, under the control of the BIOS on the BIOS-ROM 19, the gate array 14 disconnects the IDSEL # signal lines of the network controllers to be made invalid, before the started OS recognizes the network controllers.

The procedure for processing in that case will be explained by reference to the flowchart of FIG. 9.

When the user turns on the power switch (step C1), the BIOS on the BIOS-ROM 19 operates and starts the hardware initializing process (step C2). In performing the processes on various types of hardware, the BIOS sets the gate array 14 according to the setting information the user has previously set on the dialog using the utility so that the unused network controllers may be made invalid (step C3). This causes the gate array 14 to disconnect the IDSEL # signals of the network controllers to be made invalid using the switches (step C4).

After the processes up to this point have been completed, the OS is started and control is passed to the OS (step C5). At this point in time, since the IDSEL # signals of the network controllers to be made invalid have already been disconnected, the OS will never recognize the network controllers.

As described above, since control is performed by a hardware method so as to prevent the OS from recognizing the network controllers, it is possible to provide users constructing a network system with an easy-to-use environment without permitting the OS or users to recognize the unused network controllers.

The present invention is not limited to the above-described embodiment and may be practiced or embodied in still other ways without departing from the spirit or essential character thereof. For example, although the above embodiment employs a displayed screen to prompt a user to specify use/nonuse of each of a plurality of network controllers, it is possible to instead employ a switch (as a hardware) for specify use/nonuse of each of a plurality of network controllers.

As described above, with the present invention, the unused network controllers can be brought reliably into the disabled state without letting the user have a sense of troublesomeness or imposing any burden on the user in setting a plurality of network controllers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus with a plurality of network controllers, the apparatus comprising:

a screen displaying unit configured to display a screen used to specify use or nonuse of each of the plurality of network controllers;

a selling unit configured to set at least one of the plurality of network controllers, to which the use is not specified on the screen, in a disabled state; and a message displaying unit configured to display a specific message when network controllers have been specified to communicate wirelessly in a same frequency band.

2. The apparatus according to claim 1, further comprising a message displaying unit configured to display a specific message when uses of network controllers having a same logical network configuration have been specified.

3. An information processing apparatus with a plurality of network controllers that are capable of being installed in and removed from an expansion unit with a network controller, the apparatus comprising:

a screen displaying unit configured to display a screen used to specify use or nonuse of each of the plurality of network controllers provided for the information processing apparatus and the network controller provided for the expansion unit;

a setting unit configured to set at least one of the plurality of network controllers, to which the use is not specified on the screen, in a disabled state; and an information storing unit configured to store information indicating the network controllers to be used and those not to be used when the information processing apparatus is installed in or removed from the expansion unit, wherein the setting unit effects setting according to the information at the time of installation or removal.

4. A network controller setting method applied to an information processing apparatus with a plurality of network controllers, the method comprising:

displaying a screen used to specify use or nonuse of each of the plurality of network controllers;

setting at least one of the plurality of network controllers, to which the use is not specified on the screen, in a disabled state; and displaying a specific message when network controllers have been specified to communicate wirelessly in a same frequency band.

5. The method according to claim 4, further comprising displaying a specific message when uses of network controllers having a same logical network configuration have been specified.

6. A network controller setting method applied to an information processing apparatus with a plurality of network controllers that is capable of being installed in and removed from an expansion unit with a network controller, the method comprising:

displaying a screen used to specify use or nonuse of each of the plurality of network controllers provided for the information processing apparatus and the network controller provided for the expansion unit;

setting at least one of the plurality of network controllers, to which the use is not specified on the screen, in a disabled state; and storing information indicating the network controllers to be used and those not to be used when the information processing apparatus is installed in or removed from the expansion unit and, at the time of installation or removal, effecting setting according to the information.

* * * * *

UNITED STATES PATENT AND TRADEMARK OFFICE
CERTIFICATE OF CORRECTION

PATENT NO. : 6,954,656 B2 Page 1 of 1
DATED : October 11, 2005
INVENTOR(S) : Watanabe It is certified that error appears in the above-identified patent and that said Letters Patent is hereby corrected as shown below:

Column 12,
Line 26, change "selling" to -- setting --.

Signed and Sealed this

Twenty-third Day of May, 2006

JON W. DUDAS
*Director of the United States Patent and Trademark Office*